United States Patent [19]

Lange et al.

[11] 3,995,916

[45] Dec. 7, 1976

[54] SLIDE BEARING CONSTRUCTION PARTICULARLY FOR TELESCOPIC SHAFT MEMBERS HAVING UNIVERSAL SUPPORTED JOINTS AT THEIR RESPECTIVE ENDS

[75] Inventors: Günther Lange, Damme i.O.; Jürgen Ulderup, Haldem, both of Germany

[73] Assignee: Lemforder Metallwaren AG, Germany

[22] Filed: Jan. 28, 1976

[21] Appl. No.: 653,076

[30] Foreign Application Priority Data

Aug. 30, 1975 Germany .......................... 2538686

[52] U.S. Cl. ................................................ 308/6 C

[51] Int. Cl.[2] .......................................... F16C 29/00

[58] Field of Search ....................... 308/6 C; 64/23.7

[56] References Cited

UNITED STATES PATENTS

| | | | |
|---|---|---|---|
| 3,318,109 | 5/1967 | Ressler et al. | 308/6 C X |
| 3,552,806 | 1/1971 | Weasler et al. | 308/6 C |
| 3,800,558 | 4/1974 | Bothe et al. | 308/6 C X |

*Primary Examiner*—Robert R. Song
*Assistant Examiner*—Gene A. Church
*Attorney, Agent, or Firm*—McGlen and Tuttle

[57] ABSTRACT

A slide bearing construction, comprises a first part having a hollow receiving end portion with a second part telescopically slideable in the first part. One or both of the parts are adapted to have outer or opposite ends which carry universal joint structures for supporting other elements. The inner surface of the hollow end portion of the first part and the periphery of the second part defines complementary axially extending ball circulating groove portions. In addition, the second part has a cavity receiving an insert which is advantageously made of plastic material which defines an axially extending ball circulating cavity groove part which extends substantially parallel to the groove portions forming the upper ball circulating groove. The cavity in the second part also has a radially extending groove portion at its inner end with deflecting means defining a first curved ball circulating groove communicating between the radially outer ball circulating groove and a radially inner circulating groove.

6 Claims, 3 Drawing Figures

SLIDE BEARING CONSTRUCTION PARTICULARLY FOR TELESCOPIC SHAFT MEMBERS HAVING UNIVERSAL SUPPORTED JOINTS AT THEIR RESPECTIVE ENDS

FIELD AND BACKGROUND OF THE INVENTION

This invention relates in general to the construction of a slide bearing and, in particular, to an arrangement of two telescopically interengageable parts with the inner part having a cavity defining a recirculating bearing for ball bearings facilitating the axial displaceable movement between the parts.

DESCRIPTION OF THE PRIOR ART

The invention is particularly applicable to the construction of a bearing for axially displaceable parts which can be coupled together particularly for relative telescopic movement for shafts having outer ends with universal joints. In such devices, the guidance and the power transmission are effected by balls rolling off in an endless row between an inner and outer part. In such a bearing it is important that a low frictiion and low wear axially displacement takes place between the telescopic shaft parts and that a satisfactory transmission of a torque is possible both when the parts are axially displaced and when they are held in fixed relative positions. It is also desirable that the transmission of the torque be effected as free from play as possible in order to avoid annoying rattling noises. Linear ball bearings must be kept load-free during the return movements. Finally, the design of the bearing should be very simple and compact in order to keep the production costs to a minimum.

SUMMARY OF THE INVENTION

The invention provides an arrangement of slidably telescopic parts which includes an inner part having an outer periphery with a groove formation which is complementary to a similar groove formation defined on the interior wall of the outer part so that ball bearings movable in the grooves permit an axial sliding movement of the parts without relative rotational movement. In addition, the inner part includes a cavity for receiving an insert, preferably of a plastic material, which defines a recirculating portion of the race which communicates with the longitudinally extending groove on the exterior surface of the inner part. In the preferred form, the cavity of the inner part carries a portion which defines a curved radially extending groove for the return of the balls which have been circulated from a lower axially extending groove defined in the inner part to the groove defined between the two parts or vice versa. The opposite end of the inner and outer parallel axially extending grooves is capped by a collar member defining a curved return groove communicating between the inner and outer axially extending grooves.

In accordance with the invention, the insert provides covering strips which extend up to the respective ends of the axially extending grooves for the ball bearings into the hollow tubular part of the inner shaft or part. These covering strips are rounded off at their edges and the upper edge of the deflecting bores are also rounded off in the range of the bore races so that a smooth curve transition is defined between the two axially extending ball bearing grooves. In this way, the deflecting arcs of the ball races are increased and the risk that the revolution of the balls will be blocked is thus positively avoided so that the function of the bearing is improved.

In accordance with another feature of the invention, a collar journal is axially supported at the end of the part which is fitted into the hollow tubular first part. In this way, the axial forces produced by the revolution of the ball bearings are absorbed without unduly loading the collar journal. An angualr plate which is anchored by means of hooks in the wall of the inner shaft and which bears against the outer face of the collar serves as a supporting surface for this collar journal. It is also advantageous to make the collar journal of two parts which are separated from each other in a transverse plane. This facilitates the production of the collar journal and makes it possible to form this part without difficult cutting operations. The part is advantageously made of an elastomeric sliding and abrasion-resistant plastic.

Accordingly, it is an object of the invention to provide an improved slide bearing construction for two telescopically interengageable parts which includes an inner part slidably engaged with an outer part and which together define opposed grooves at their engagement surfaces for recirculating ball bearings in an outer axially elongated ball bearing groove and which includes an inner axially elongated groove defined in the inner second part and with end curved grooves extending between the inner and outer axially extending grooves at each end for forming a closed annular circulation path for the ball bearings and, wherein, at least the outer curved return portion of the circulation path is defined in a collar which abuts against the end of the second part.

A further object of the invention is to provide a sliding part assembly which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

DESCRIPTION OF THE PREFERRED EMBODIMENT

Figures 1, 2, 3:
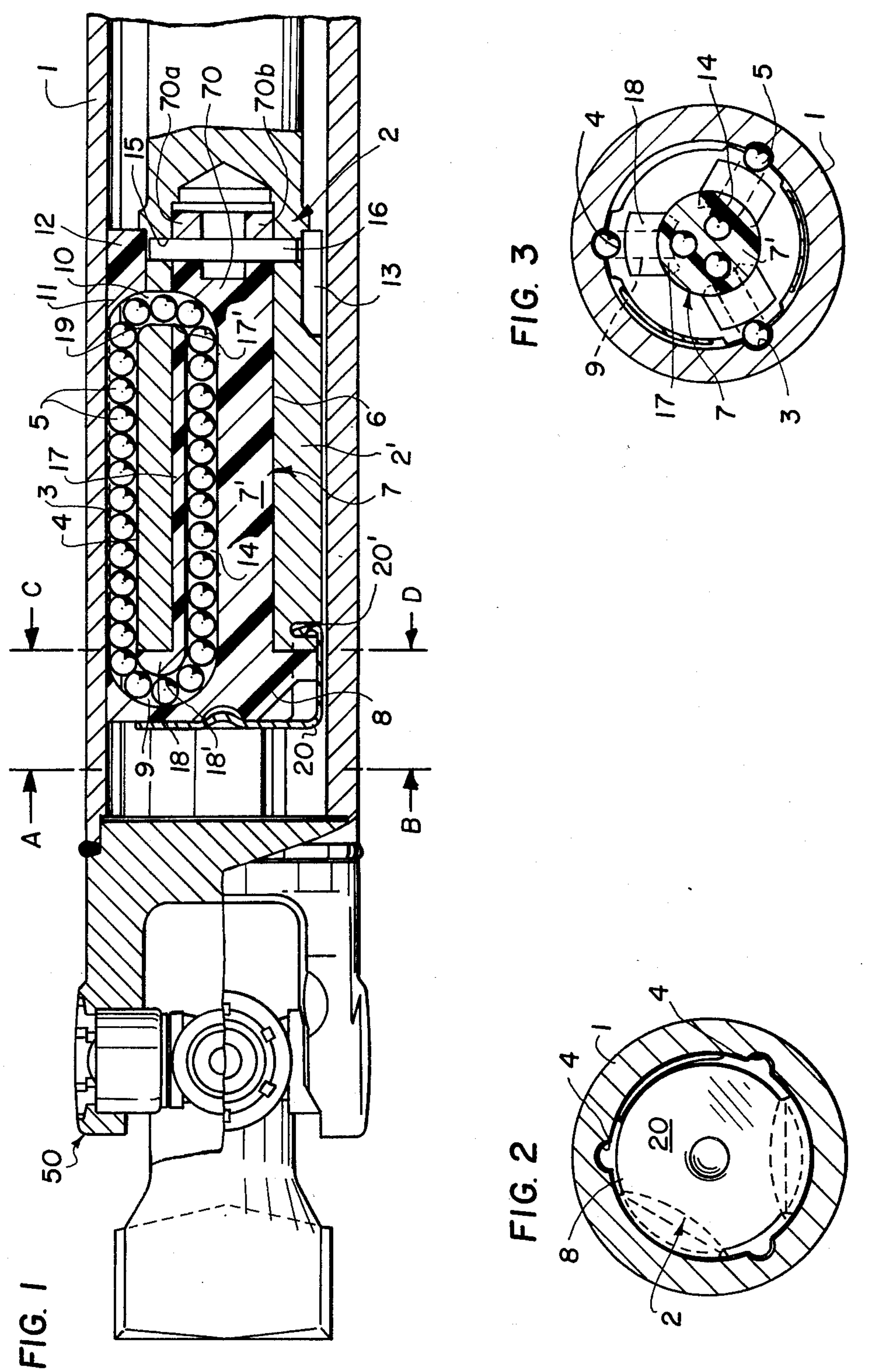
FIG. 1 is a partial axial sectional view of a telescopic shaft bearing construction for the mounting of one or more parts of universal joint structures at their ends which are not interengaged.
FIG. 2 is a section taken along the line A–B of FIG. 1.
FIG. 3 is a section taken along the line C–D of FIG. 1.

Referring to the drawing in particular, the invention embodied therin, comprises a pair of telescopically interengaged parts or shafts which include a first or outer part 1 having a universal joint formation, generally designated 50, at one outer end and having an opposite end with a hollow portion which receives an inner part, generally designated 2.

In accordance with the invention, inner part 2 is supported within outer part 1 for axial displacement without relative rotational movement. For this purpose, outer part 1 has an interior surface with at least one inner groove 3, which cooperates with a complementarily formed groove 4 formed in the outer periphery of inner part 2. In the embodiment illustrated, three grooves at equally spaced locations are defined around the interior surface of outer part 1 in alignment with similar grooves, which are defined on the peripheries of each of three leg portions of inner part 2. The two grooves 3 and 4 form semi-circular portions of a circular cross-section groove for the circulation of ball bearings 5 therealong.

The inner part or inner shaft 2 has a section 2' with a bore or cavity 6 into which is inserted a journal or insert, generally designated 7. Insert 7 advantageously comprises a sliding and abrasion-resistant plastic material, and a collar portion or separate collar 8 closes the inner end of the cavity at the inner end of the inner part 2. In accordance with a feature of the invention, collar 8 includes a radially extending recess or groove 9 forming two deflecting arcs for communicating the upper ball bearing axially extending race portion between the grooves 4 and 3 with a lower ball bearing race portion defined by an axially elongated guide groove 14. The opposits or outer end of the inner part 2 carries an inner curved connecting portion 70 of insert 7 which defines a deflecting curved surface which communicates with a through bore 10 defined between an inner and outer part of the shaft section 2'. A cam ring 12 is fitted around inner part 2 in the vicinity of the connecting portion 70 of the insert 7 and it encloses a holding pin 16 which extends transversely through leg portions **70*a* and 70*b*. The inner end surface of ring cam 12 defines a cam 11 forming a curved surface for deflecting the ball backwardly into the outer axially extending ball circulating groove defined between the grooves 3 and 4. A similar cam surface is defined on collar 8 adjacent the outer axially extending ball bearing circulating groove. Cams 11 also engage into semi-circular grooves 4 of tubular shaft 1 along with the balls 5 so that the collar 8 and cam ring 12, along with inner part 2, are not free to rotate relative to the outer part 1. Insert 7 carries the axis parallel inner ball bearing guide groove 14 so that the balls can roll back therein load-free. The end grooves 9 and 10, together with the deflecting cams and a nose formation 18 at the end of the inner part 2, along with the outer ball recirculating groove between the grooves 3 and 4 and the inner circulating groove in the guide groove 14, form an annular closed recirculating race for the ball bearings 5.**

As seen particularly in FIGS. 1 and 3, three guide grooves 14 for the return of the balls are arranged radially inwardly of each of the three equally spaced leg portions which contain the axial grooves defined between the groove portions 3 and 4 which are arranged radially outwardly. Grooves 14 which are formed in the hollow inner part 2 are covered on the interior wall side by strip portions 17 of insert 7 and strip portions 17 form the upper guide surface for the balls. Each of these insert strips carries a nose portion 18 at the exterior of the hollow inner part 1 which undergrips the edge of this part and forms a curved side guide wall for the return movement of the balls. Due to the deepening of guide grooves 14, strip portions 17 are embedded flush with the shell of the journal so that a base is obtained for the extension 18 and a curved race 18' with an increased radius is formed. The other end of each strip portion 17 is a rounding or rounded portion 17' which aligns with one end of the bores 10. The upper edge of deflecting bore 10 is also provided with a rounded portion 19. In this way, an increased arcuate deflecting race is formed in the range of the bore through which the balls pass so that a trouble-free revolution of the balls is ensured.

Collar portion 8 is supported on the end of inner member 2 by an angle plate 20 which engages by means of a hook portion 20' into slots formed in the wall of the hollow shaft part 2'. Plate 20 bears with pressure on the outer end face of collar 8. The bearing collar 8 preferably comprises two separate parts 7 and 7' which are separated in the transverse direction and which facilitate the easy manufacture of the part, particularly if it is made of a plastic material.

While a specific embodiment of the invention has been shown and described in detail to illustrate the application of the principles of the invention, it will be understood that the invention may be embodied otherwise without departing from such principles.

What is claimed is:

1. A slide bearing construction, comprising a first part having a hollow receiving end portion, a second part telescopically slidable in said first part hollow end portion, the inner surface of said first part hollow end portion and the periphery of said second part defining complementary axially extending ball circulating groove portions which together define outer axially extending ball circulating groove portions, said second part having a cavity therein including an axially extending cavity defining a radially inner ball circulating groove part which extends substantially parallel to said radial outer groove part, said cavity in said second part having a radially extending groove portion at the inner end of said cavity with deflection means defining therewith a first curved ball circulating groove communicating between said outer and inner ball circulating groove portions, said second part having a collar portion adjacent the end which is positioned in said first part and which defines a second curved ball circulating groove communicating between said outer and inner ball circulating groove parts, said first and second curved ball circulating groove portions, said outer and inner ball circulating groove portions together defining a continuous ball circulating race, and ball bearings in said race.

2. A slide bearing construction, according to claim 1, wherein said insert includes a portion extending into the part of said second hollow part defining said radially inner ball circulating groove part and forming an upper glide surface for the balls therein and having an end part which is rounded and extends between said insert portion and said radial upper ball circulating groove part to define a curved deflecting surface spaced from a similar curved surface of said collar for the circulation of balls therethrough.

3. A slide bearing construction, according to claim 1, including an angle plate covering said collar and having a hook-shape end, said second part having a receiving recess into which said hook-shape end of said angle plate extends to hold said collar to said second part.

4. A slide bearing construction, according to claim 1, wherein said insert and said collar portion are made of two parts divided transversely.

5. A slide bearing construction, according to claim 1, wherein said insert includes a covering strip made of an elastomeric sliding and abrasion-resistant plastic material forming a lining at the interior of said radially inner ball circulating groove portion.

6. A slide bearing construction, according to claim 1, wherein said insert includes a separate shaft portion insertable into said hollow part and a separate wider portion forming said collar, the inner end of said shaft portion having an opening therethrough, a clamping pin extending through the opening of said inner end through a bore of said inner part, a holding ring surrounding said clamping pin and preventing withdrawal thereof, and defining a cam surface or its end which forms a portion of a curve of the second curved ball circulating groove.

* * * * *